No. 706,554. Patented Aug. 12, 1902.
J. L. HALL.
SPEED INDICATING SYSTEM.
(Application filed Nov. 29, 1901.)
(No Model.)
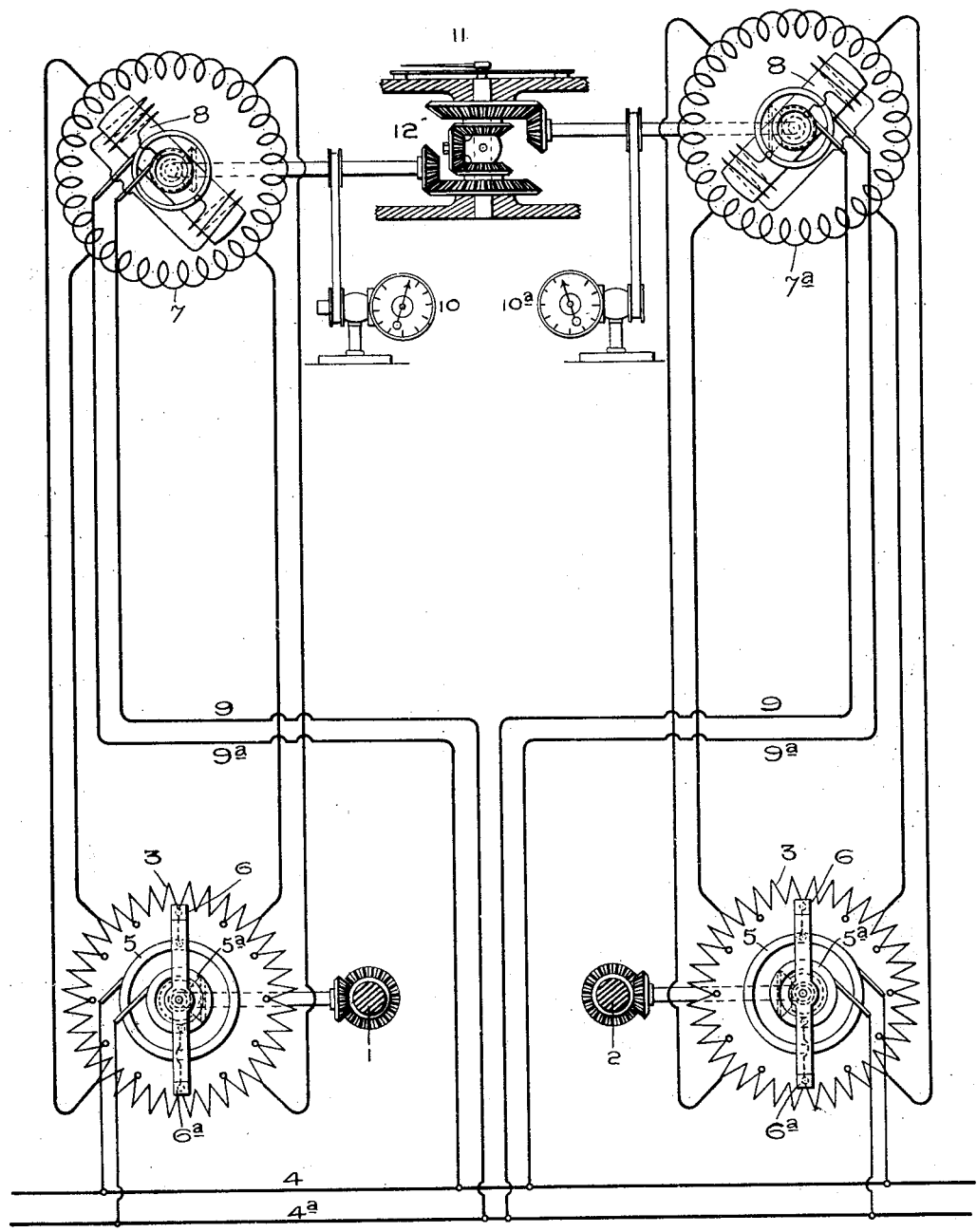
Witnesses:
Marcus L. Byng.
Benjamin W. Hull.
Inventor:
John L. Hall,
by Albert G. Davis
Atty.

UNITED STATES PATENT OFFICE.

JOHN L. HALL, OF SCHENECTADY, NEW YORK, ASSIGNOR TO GENERAL ELECTRIC COMPANY, A CORPORATION OF NEW YORK.

SPEED-INDICATING SYSTEM.

SPECIFICATION forming part of Letters Patent No. 706,554, dated August 12, 1902.

Application filed November 29, 1901. Serial No. 83,957. (No model.)

*To all whom it may concern:*

Be it known that I, JOHN L. HALL, a citizen of the United States, residing at Schenectady, in the county of Schenectady, State of New York, have invented certain new and useful Improvements in Speed-Indicating Systems, (Case No. 2,410,) of which the following is a specification.

It is frequently desirable to indicate the difference of speed of two rotating machines. For example, in operating ship-engines it is desirable that the officer on the bridge should know not only the absolute speed but also the relative speed of the port and starboard engines where two engines are employed, as in twin-screw ships, and that this information shall be communicated instantly. Such a device is of great advantage in fleet maneuvers, giving the officer on the bridge instantaneous information as to the rapidity with which the engines respond to orders telegraphed from the bridge and permitting also the vessel to be steered by the difference of speed of the two engines when such steering becomes necessary by reason of accident to the steering-gear.

It is the object of my invention to provide a device of this character which will be simple in construction, reliable in operation, and not liable to get out of order.

In carrying out the invention I provide at each of the ship's engines or other rotating part of the machines to be compared a variable resistance operatively arranged to rotating brushes, so as to develop polyphase currents from a direct-current circuit. These currents are transmitted by three or more wires to the indicating instrument on the bridge or other part of the vessel to which it may be desired to communicate information. A similar commutator is mounted on each engine, each leading to a synchronous motor in the base of the receiving apparatus. The two motors drive tachometers to show absolute speed, and in addition drive differential gearing operating a pointer turning on a dial from which the difference in speed may be read.

My invention therefore comprises a speed-indicating system consisting of a device for generating alternating currents by each of the machines to be compared and a receiving apparatus to differentiate the speed of the two machines. More specifically considered, it comprises means for generating polyphase alternating currents by the revolution of the several machines and synchronous motors propelled by the currents thus supplied and operating jointly on differential gearing controlling an indicating device.

The novel features will be more specifically pointed out hereinafter and will be definitely indicated in the claims.

In the accompanying drawing, which diagrammatically illustrates the invention, 1 and 2 represent shafts of the machines whose speeds are to be compared—for example, may represent the engine-shafts. Each is geared to a generator of polyphase current which is transmitted over a suitable circuit to the receiving instruments. These generators may be of any suitable character. I prefer, however, to employ a variable resistance 3, from equidistant points of which taps are led to the transmitting-circuit. I have shown in the drawing a two-phase arrangement with four taps by which quarter-phase currents will be generated. Direct current is led to the resistance from a direct-current source of supply (indicated by the mains 4 4$^a$) by means of brushes bearing on ring-contacts 5 5$^a$, connected to a rotary system, which carries brushes 6 6$^a$, connected with the respective rings. These brushes sweep over a circular range of contacts tapping into the resistance 3 at equidistant points after the fashion of the connections to the Gramme-ring armature in a dynamo-electric machine. The resistance 3 may be stationary and the brushes movable, as indicated in the drawing, the brushes being driven by a shaft geared to the shaft 1. Thus when the engine is in operation the brushes are shifted over the circle of contacts, and the amount of resistance between the supply-mains 4 4$^a$ and the respective leads in the polyphase transmitting-circuit is continuously varied. In fact, alternating currents are developed in the transmitting-circuit. These are led by a suitable number of leads to a synchronous motor at each receiving instrument, one such motor being employed for each transmitter.

The motor consists of a closed coil-winding 7, in which a rotary field is developed by the polyphase current transmitted, slow or fast, according to the speed of the driving-engine. The armature 8 of the motor may be excited from the direct-current circuit 4 4ᵃ by suitable leads 9 9ᵃ, current being led in by ring-contacts and brushes in the ordinary manner. A precisely-similar arrangement is adopted with respect to the companion motor 7ᵃ. The shafts of these motors act upon tachometers 10 10ᵃ, which indicate absolute speeds, and differential gearing driven by the motor system operates a pointer 11, mounted for revolution over an indicating-dial, upon which a suitable scale may be marked. The pointer is mounted on a shaft carrying an arm on which turns a gear-wheel 12, in mesh at the top and bottom, respectively, with gear-wheels driven by the respective motor-shafts. Thus so long as the speeds of the two motors are exactly the same the pointer 11 will stand still. Any difference of speed, however, will be indicated by a progressive movement of the pointer, whose speed of movement is an exact measure of the difference in speed of the two motors, and by observing the proper ratio of gearing in the system the indications are an exact representation of the difference in speed of the engines being compared.

The arrangement indicated in the drawing for transmission by means of variable resistance is found to be more satisfactory in practice than a dynamo-electric generator of polyphase currents, since it is more accurate with low machine-speeds, and as in many uses on shipboard the speed of the engines is quite low I prefer to employ the variable-resistance type of generator described. Where a high speed is desired, a dynamo-electric generator might be substituted, if preferred.

What I claim as new, and desire to secure by Letters Patent of the United States, is—

1. A speed-indicating system comprising two sources of alternating current, synchronous motors driven thereby, and differential gearing driven by the joint action of the two motors to show the speed relation of the two machines.

2. A speed-indicating system comprising two alternating-current generators, polyphase circuits connecting therewith, and an indicator differentially driven by rotary fields set up by the polyphase currents.

3. A speed-indicating system comprising two alternating-current generators, synchronous motors, tachometers operated by the motors, differential gearing driven by the motor system, and an indicator operated thereby to show difference of speed.

4. A speed-indicating system comprising a resistance, a source of direct current, commutators for converting the direct into alternating currents, synchronous motors in the alternating-current circuits, and a differential indicator showing differences of speed of the motors.

In witness whereof I have hereunto set my hand this 22d day of November, 1901.

JOHN L. HALL.

Witnesses:
BENJAMIN B. HULL,
CHARLES STEINER.